United States Patent [19]

Keil et al.

[11] 4,425,024

[45] Jan. 10, 1984

[54] PLANAR ELECTRO-OPTICAL LIGHT DEFLECTOR FOR SEVERAL BEAM POSITIONS

[75] Inventors: Rudolf Keil, Munich; Franz Auracher, Baierbrunn, both of Fed. Rep. of Germany

[73] Assignee: Siemens Aktiengesellschaft, Berlin & Munich, Fed. Rep. of Germany

[21] Appl. No.: 268,337

[22] Filed: May 29, 1981

[30] Foreign Application Priority Data

Jul. 2, 1980 [DE] Fed. Rep. of Germany ....... 3025083

[51] Int. Cl.³ .............................................. G02B 5/174
[52] U.S. Cl. .................................. 350/96.14; 350/96.13
[58] Field of Search ................ 350/96.12, 96.13, 96.14

[56] References Cited

U.S. PATENT DOCUMENTS

| | | | |
|---|---|---|---|
| 4,047,795 | 9/1977 | Hughes et al. | 350/96.14 |
| 4,056,304 | 11/1977 | Phillips | 350/96.14 |
| 4,264,125 | 4/1981 | Shibata | 350/96.14 |
| 4,394,060 | 7/1983 | Verber et al. | 350/96.13 |

FOREIGN PATENT DOCUMENTS

| | | | |
|---|---|---|---|
| 527973 | 8/1977 | U.S.S.R. | 350/96.14 |
| 528798 | 8/1977 | U.S.S.R. | 350/96.14 |

OTHER PUBLICATIONS

Tsai, C. S. et al, "Ultrafast Guided-light Beam Deflection/Switching . . . ", Applied Physics Letters, vol. 27, No. 4, Aug. 15, 1975 pp. 248–250.
Hammer, J. M., et al, "Low-loss single–mode Optical Waveguides . . . ", Applied Physics Letters, vol. 24, No. 11, Jun. 1, 1974, pp. 545–547.
Schmidt, R. V., "Acousto-optic Diffraction of Guided Optical Waves in LiNbO$_3$", Applied Physics Letters, vol. 23, No. 8, Oct. 15, 1973, pp. 417–419.
Belin et al, "Integrated-Optical Switching System," Sov. J. Quantum Electron., vol. 10, No. 2, Feb. 1980, pp. 249–250.

*Primary Examiner*—John D. Lee
*Attorney, Agent, or Firm*—Hill, Van Santen, Steadman & Simpson

[57] ABSTRACT

A planar electro-optical light deflector is operable to provide a plurality of beam positions and is characterized in that the same is a Bragg deflector having several adjacently-disposed electrode structures which are separately activatable, have respective different grid constants and are disposed on a layer waveguide inclined in such a manner that the light impinges on the respective electrode structures under respective Bragg angles, whereby the layer waveguide is capable of excitation over a width which corresponds to the totality of all electrode structures.

10 Claims, 3 Drawing Figures

PLANAR ELECTRO-OPTICAL LIGHT DEFLECTOR FOR SEVERAL BEAM POSITIONS

BACKGROUND OF THE INVENTION

1. Field of the Invention

The present invention relates to a light deflector, and more particularly to a planar electro-optical light deflector for controlling a light beam with respect to a plurality of beam positions.

2. Description of the Prior Art

Light deflectors for several beam positions are employed, for example, in the case of laser printers, because several vertically-superimposed points can be simultaneously recorded, as a consequence of which the number of recorded symbols, given the same horizontal recording speed, is multiplied.

It is known to employ ultrasonic deflectors for this purpose which are excited with several different frequencies, and each frequency then corresponds to a specific deflection angle (Schmidt, R. V.; Kaminow, I.P.; Carruthers, J. R.: Acousto-optic diffraction of guided optical waves in LiNbO$_3$, Applied Physics Letters 23 (1973), p. 417). However, ultrasonic deflectors have the disadvantage that they require a (high) carrier frequency and a considerable amount of driving power.

Electro-optical light deflectors embodied in a waveguide exhibit considerable advantages with respect to their activation (or control) as compared with acousto-optical deflectors. Electro-optical light deflectors operate in the baseband; i.e. they are directly driven with the modulation frequency. Also, with regard to the driving power, the advantages clearly lie on the side of the electro-optical deflector, since a comparatively high high-frequency power is required for the generation of the sonic field in the acousto-optic deflector.

However, the known electro-optical Bragg deflectors in a waveguide embodiment make possible only two beam positions, which, moreovver, cannot be activated independently of one another (Hammer, J. M.; Phillips, W.: Low-loss single-mode optical waveguides and efficient high-speed modulators of the LiNb$_x$Ta$_{1-x}$O$_3$ on LiTaO$_3$, Applied Physics Letters 24 (1974), p. 545). The construction of a conventional electro-optical Bragg deflector in a waveguide embodiment is illustrated in FIG. 1. In an electro-optical crystal (e.g. LiNbO$_3$, LiTaO$_3$ or GaAs) an optical layer waveguide is produced. By way of an interdigital finger-shaped electrode structure, due to the electro-optical effect, it is possible to induce, through application of a voltage, a refractive index grid in a waveguide. If the light strikes the grid under the Bragg angle $\theta_B$, it is then reflected and, thus, altogether deflected by the angle $2\theta_B$, whereas, without voltage applied to the electrodes, it propagates (or travels) in straight lines. The Bragg angle in the crystal results from the grid constants $\Lambda$ and the light wavelength $\lambda$ in the crystal to $$\theta_B \approx \lambda/2\Lambda.$$

With known electro-optical prism deflectors in a waveguide embodiment (Tasi, C.S.; Saunier, P.: Ultrafast guided-light beam deflection/switching and modulation using simulated electro-optic prism structures in LiNbO$_3$ waveguides, Applied Physics Letters 27 (1975), p. 248), more than two beam positions can, indeed, be obtained; however, these are likewise not capable of being activated independently of one another, and the light cannot be deflected, as desired, simultaneously in several directions.

SUMMARY OF THE INVENTION

The object of the present invention, therefore, is to provide a beam deflector of the type generally set forth above in which several beam positions can be activated independently of one another, and in which the light can be deflected, as desired, simultaneously in several directions.

According to the invention, the above object is achieved in that the planar electro-optical light deflector is a Bragg deflector having several adjacently-disposed electrode structures, whereby the electrode structures are separately activatable, exhibit different grid constants and lie on a layer waveguide inclined in such a manner that the light impinges on the respective electrode structure under the respective Bragg angle, whereby the layer waveguide is capable of excitation via a width which corresponds to the totality of all electrode structures.

In the case of a given intensity distribution of the incident light beam, in order to be able to deflect the desired relative light energy in each beam position, in accordance with a particular embodiment of the invention, the widths of the individual electrode structures are designed corresponding to the desired intensities of the respective deflected light beams.

A control of the intensities of the respective deflected light beams, however, can also take place via the voltages applied to individual electrode structures.

In accordance with a further feature of the invention, the planar electro-optical light deflector comprises an additional fixed grid structure for the division (or separation) of the incident light beam into n component beams having different directions, whereby the component beams strike deflectors. The deflectors can be constructed in the form of Bragg deflectors or in the form of prism deflectors. The component beams can be modulated, or switched, respectively, by these deflectors. The relative intensity of the deflected component beams is first determined via the grid structure; however, it can also be adjusted by the deflecting voltage.

The grid structure can be produced, for example, through etching of grid-shaped depressions in the surface of the substrate, whereby the grid structure itself is produced, for example, photolithographically via a mask or holographically. However, the grid structure can also be manufactured, for example, by producing a refractive index grid in the waveguide, whereby the refractive index grid is produced, for example, through diffusion of metals into the waveguide or through ion implantation through a suitable mask.

Preferably, a planar electro-optical light deflector constructed in accordance with the present invention is employed for an optical printer for the purpose of the simultaneous printing of several points.

The electrode structures required for the planar electro-optical light deflectors constructed in accordance with the invention can all be manufactured by means of the planar technique in one work step.

If the instant light beam is divided (or separated) into component beams by a fixed grid structure, whereby the component beams then strike deflectors, then an advantage results from the basic possibility that the entire incident light can be separated into component beams which are capable of modulation.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
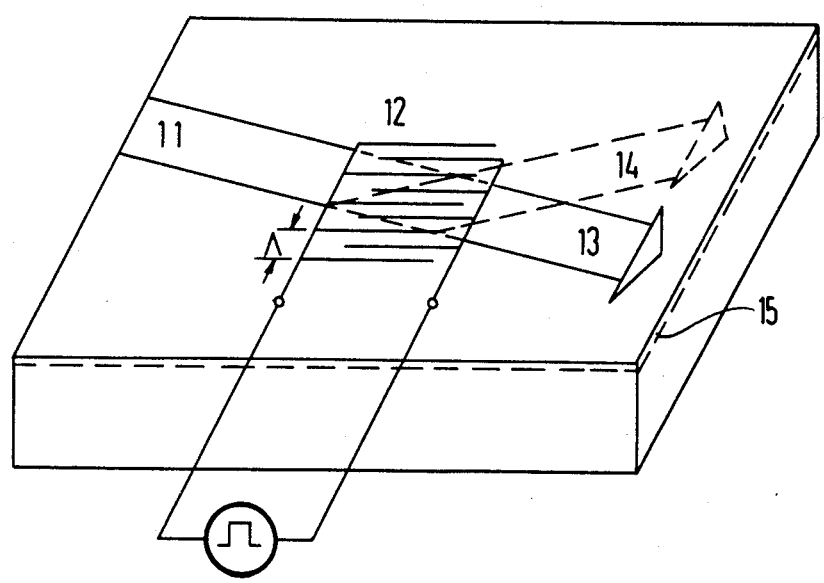
FIG. 1 is a schematic illustration of a planar electro-optical Bragg deflector for two beam positions according to the prior art.

FIG. 1 has been discussed above and will not be dealt with in further detail herein.

Figure 2:
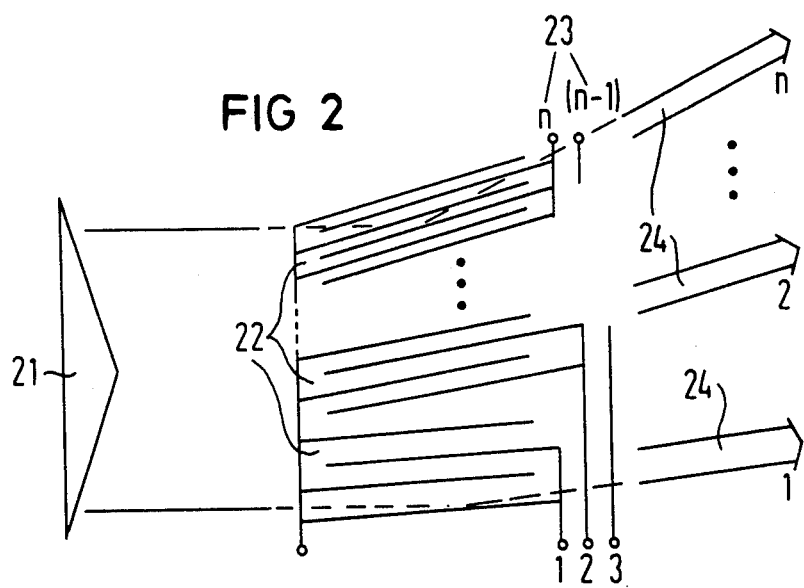
FIG. 2 is a schematic representation of a planar electro-optical light deflector, according to the present invention, for n beam positions.

FIG. 2 is a schematic representation of a planar electro-optical light deflector for n beam positions. An incident light beam 21 excites the layer waveguide over a width which corresponds to the totality of all electrode structures 22. The n adjacently-disposed electrode structures have different grid constants and are disposed on the layer waveguide inclined in such a manner that the light strikes the respective electrode structure 22 under a respective Bragg angle. By way of connections 23, the electrode structures 22 are separately activatable, so that the light beam 21 can be deflected, as desired, simultaneously in the form of component beams 24 in several directions.

Figure 3:
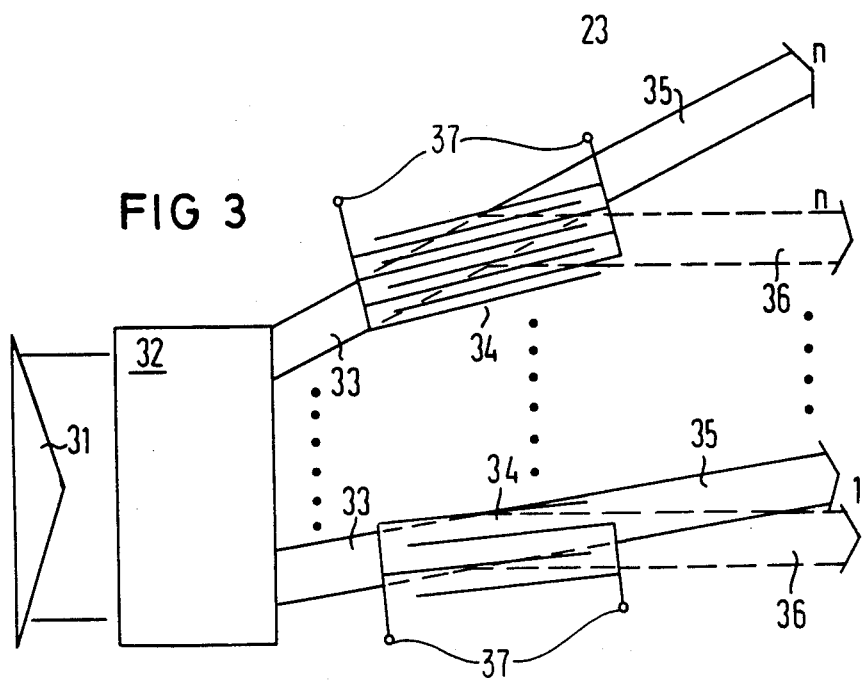
FIG. 3 is a schematic representation of a planar electro-optical light deflector, again according to the present invention, for n beam positions, whereby the light separation into n component beam occurs with a grid structure, and the light deflection occurs with n light deflectors.

FIG. 3 illustrates, in a schematic form, a planar electro-optical deflector for n beam positions, whereby the light separation into n component beams occurs with a grid structure, and the light deflection occurs with n light deflectors. By way of the grid structure 32, the instant light beam 31 is separated into n component beams having different directions, whereby n component beams 33 impinge on n light deflectors 34. The n light deflectors 34 have respective different grid constants and are disposed on the layer waveguide inclined in such a fashion that the n component beams 33 impinge on the respective electrode structures under the respective Bragg angles. By way of the connections 37, the n light deflectors 34 are separately activatable. If no voltage is applied to the connections 37 of a light deflector 34, then, depending upon the magnitude of the applied voltage, the respective component beam 33 is entirely, or partially, deflected, by twice the Bragg angle, to the corresponding component beam 36, whereby the non-deflected respective light intensity forms the respective component beam 35.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A planar electro-optical light deflector for deflecting an incident light beam to a plurality of beam positions, comprising:
   an optical layer waveguide for receiving an incident light beam; and
   a plurality of separately activatable electrode structures on said waveguide for producing deflection grids, said electrode structures being adjacently-disposed across the direction of beam incidence,
   said electrode structures having respective different grid constants and disposed at respective inclinations on said waveguide so that the incident light beam impinges at the respective Bragg angles,
   whereby said layer waveguide is capable of receiving incident light over a width which corresponds to that of the totality of said plurality of electrode structures.

2. The light deflector of claim 1, wherein:
   each electrode structure includes a width which represents the desired light intensity of its respective deflected beam.

3. The light deflector of claim 1, wherein:
   each electrode structure comprises means responsive to the magnitude of voltage applied thereto to control the light intensity of its respective deflected beam.

4. A planar electro-optical light deflector for deflecting an incident light beam to a plurality of beam positions, comprising:
   an optical layer waveguide for receiving an incident light beam;
   a fixed grid structure in said waveguide for dividing the incident light beam into a plurality of component beams; and
   a plurality of electro-optical deflectors for the respective component beams, each electro-optical deflector comprising a separately activatable electrode structure, said electrode structures disposed adjacent one another across the waveguide and inclined at respective angles.

5. The light deflector of claim 4, wherein:
   said light deflectors are Bragg deflectors.

6. The light deflector of claim 4, wherein:
   said light deflectors are prism deflectors.

7. The light deflector of claim 4, wherein:
   each of said deflectors comprises means responsive to a voltage applied to its electrode structure to modulate the respective component beam.

8. The light deflector of claim 4, wherein:
   each of said deflectors comprises means responsive to a voltage applied to its electrode structure to switch the respective component beam.

9. The light deflector of claim 4, wherein:
   said fixed grid structure comprises means for at least partially determining the relative light intensities of the component beams.

10. An optical printing device, comprising:
    a laser for generating a light beam; and
    a planar electro-optical light deflector for deflecting an incident light beam to a plurality of printing positions, comprising:
      an optical layer waveguide for receiving an incident light beam; and
      a plurality of separately activatable electrode structures on said waveguide for producing deflection grids, said electrode structures being adjacently-disposed across the direction of beam incidence,
      said electrode structures having respective different grid constants and disposed at respective inclinations on said waveguide so that the incident light beam impinges at the respective Bragg angles,
      whereby said layer waveguide is capable of receiving incident light over a width which corresponds to that of the totality of said plurality of electrode structures.

* * * * *